Dec. 2, 1941.                G. C. BARNES                2,264,868
                    MEANS FOR MANUFACTURING BEARINGS
                         Filed May 4, 1940
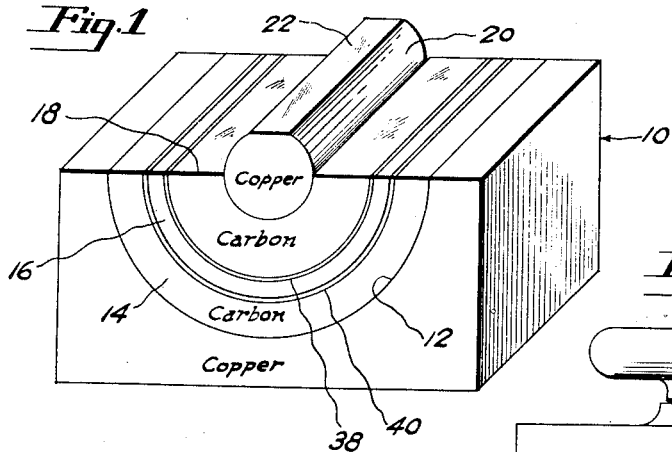
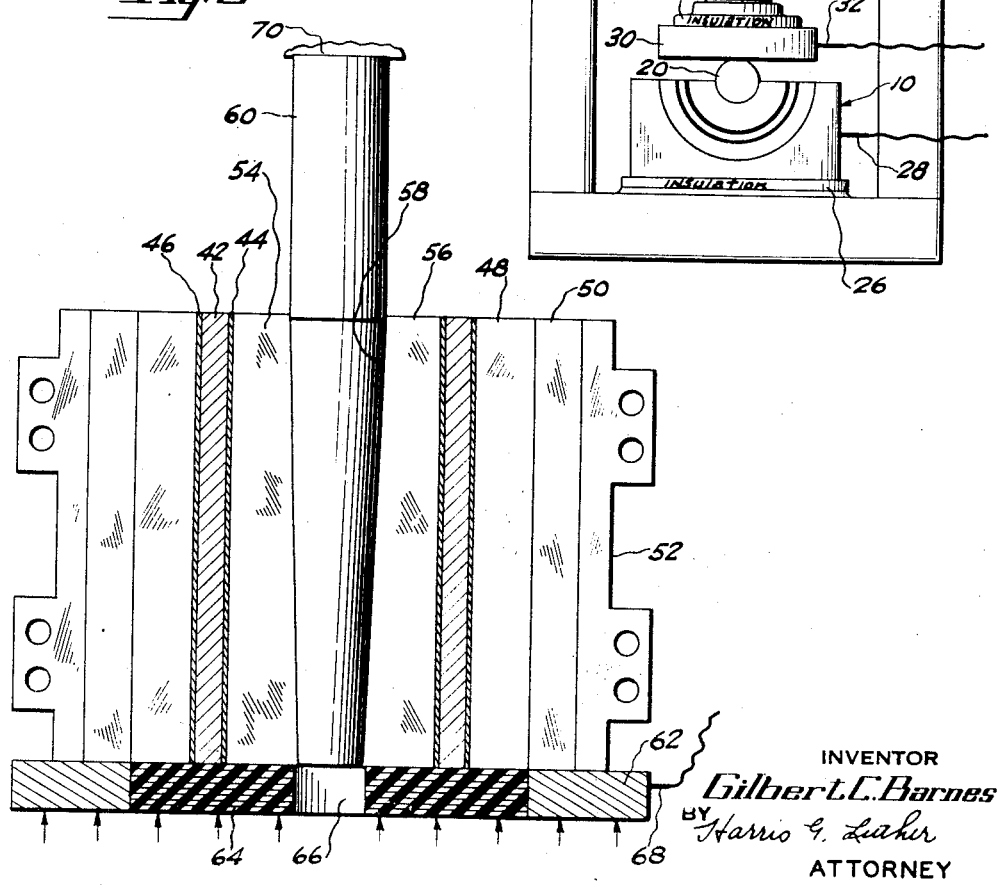
INVENTOR
Gilbert C. Barnes
BY Harris G. Leaher
ATTORNEY Patented Dec. 2, 1941

2,264,868

UNITED STATES PATENT OFFICE 2,264,868

MEANS FOR MANUFACTURING BEARINGS

Gilbert C. Barnes, Manchester, Conn., assignor to United Aircraft Corporation, East Hartford, Conn., a corporation of Delaware Application May 4, 1940, Serial No. 333,440

6 Claims. (Cl. 219—12)

This invention relates to an improved means for securing metal coatings to a body of base metal, and has particular reference to an improved means for manufacturing anti-friction bearings.

An object of the invention resides in the provision of an improved means for bonding a lining of one metal onto the surface of a rigid body of a different metal by fusing a layer of bonding material to the mating surfaces.

A further object resides in an improved means for manufacturing anti-friction bearings by electrically heating a layer of bonding material to bond a layer of bearing material onto one or more surfaces of a steel backing or reinforcing member.

A still further object resides in a means for manufacturing anti-friction bearings by simultaneously holding bearing components in substantially finished size and shape and uniting them electrically, adapted to utilize a commercial electric welding machine in carrying out the method.

Other objects and advantages will be more particularly pointed out hereinafter or will become apparent as the description proceeds.

In the accompanying drawing, in which like reference numerals are used to designate similar parts throughout, there is somewhat diagrammatically illustrated suitable apparatus for carrying out the improved method in the manufacture of two slightly different bearing constructions. The drawing, however, is for the purpose of illustration only and is not to be taken as limiting the invention as it will be apparent to those skilled in the art that various changes in the illustrated apparatus may be resorted to without in any way exceeding the scope of the invention.

In the drawing, Fig. 1 is a perspective view of suitable special apparatus for applying one or more coatings of bearing metal to a split or semi-cylindrical backing member.

Fig. 2 is an elevational view showing the special apparatus of Fig. 1 inserted in operative position in a diagrammatically indicated electric welding machine, and Fig. 3 is a sectional view through special apparatus arranged to apply a coating of bearing material to one or more of the surfaces of a complete or cylindrical backing member.

Referring to the drawing in detail, and particularly to Figs. 1 and 2, the numeral 10 generally indicates a supporting or base block which may conveniently be formed of copper and has a semi-cylindrical depression 12 in one side thereof. Within the depression 12 there is disposed a semi-cylindrical high resistance element 14 of carbon or some other material having a relatively high electrical resistance and capable of withstanding relatively high temperatures, the inner surface of which has a curvature substantially the same as the curvature of the outer surface of the backing member 16 which may be a machine element, such as a connecting rod, or a bearing shell as illustrated. A second semi-cylindrical carbon block 18 fits the inner surface of the bearing 16 and has a semi-cylindrical depression in the flat face thereof which receives a generally cylindrical copper electrode member 20 having a flattened surface 22 along one side thereof.

Before assembly of the bearing parts with the copper and carbon elements described above, one or both of the mating surfaces of the bearing backing and liner may be coated with a layer of suitable bonding material, such as silver solder, or a thin sheet of such bonding material may be interposed between said mating surfaces, and said surfaces may be treated with a suitable flux to facilitate the wetting of the surfaces by the bonding material and improve the adherence of the bonding material to said surfaces.

The bearing material is preferably cut from rolled sheets of uniform thickness and texture and applied to the backing member in contact with the tinned surface portion thereof or the interposed layer of bonding material. This bearing material may be silver or some other suitable metal or alloy having desirable anti-friction characteristics and sufficient mechanical strength to carry the load which will be imposed on the bearing in operation.

After the layer of bearing material has been applied to the backing member, the backing member is assembled in the block shown in Fig. 1 and the entire assembly is then placed in an electric welding machine, such as is schematically illustrated in Fig. 2 and generally indicated by the numeral 24. The carrying block 10 is preferably placed upon a body of insulating material 26 in contact with an electrode 28, and a pressure plate 30, in contact with an electrode 32 and separated from the remainder of the machine by an insulating block 34, is brought into contact with the flat face 22 of the copper rod member 20. Pressure is then applied to the assembly by some suitable means schematically indicated by the screw jack 36 and electrical energy is supplied through the electrodes to fuse the bonding material under pressure and obtain a firm and rigid bond between the adjacent surfaces of the bearing material and the backing member. While, in the illustration, bearing layers, as indicated at 38 and 40, have been shown applied to both the inner and outer surfaces of the backing member, it is to be understood that the bearing material may be applied to either one or to both surfaces as the bearing construction may require.

After the assembly has been placed in the electric welding machine the pressure is applied to a predetermined extent and for a predetermined time interval and the electric energy is controlled both as to current strength and time of application in order to provide the desired bond, both factors depending to some extent on the area of the surface to be coated with the bearing material.

After the fusing or welding time has elapsed the assembly may be removed from the welding machine and the bearing removed from between the carbon blocks 12 and 18. By choosing the proper size of backing member and bearing material sheet this bearing will be found in condition for use upon removal from the welding or fusing assembly since the dimensions and surface of the carbon blocks are accurately produced to give the desired dimensions and surface finish to the bearing and the use of carbon does not contaminate the bearing surface with any foreign material that has to be removed by subsequent cleaning operations.

In the arrangement shown in Fig. 3 the backing member 42 is formed as a complete cylinder and is provided with bearing linings, as indicated at 44 and 46, upon both the inner and outer surfaces thereof, although the coating or lining may be limited to either surface without in any way exceeding the scope of the invention.

After the layers of bearing material are placed in position upon the backing member a two part cylindrical carbon block 48 is placed about the outside of the bearing and this carbon block is inserted in a split copper cylinder 50 and the two parts of an outer clamp, as indicated at 52, are placed about the copper cylinder and secured together to firmly retain the structure in assembled relation and against spreading under pressure. Carbon segments, as indicated at 54 and 56 are then inserted in the interior of the bearing to form a hollow cylindrical body within the bearing, the bore 58 of this body being tapered from top to bottom as is clearly indicated in Fig. 3. A copper rod member 60, having a tapered end portion fitting the taper of the bore in the interior carbon body, is then inserted into the bore and the entire assembly is placed upon a base plate comprising an outer ring 62 of copper and an inner portion 64 of insulating material provided with a central aperture 66 for the end of the rod 60.

The entire assembly including the base plate is then placed in an electric welding machine and an electric terminal 68 is brought into contact with the ring 62 and another terminal 70 is brought into contact with the end of the rod 60 and pressure is applied between the base plate and the end of the rod in a manner to force the tapered end of the rod into the inner carbon body and expand the segments against the inner lining of bearing material. The outer carbon cylinder 48 is pressed against the outer bearing material by the clamp 52. When electric energy is applied to the terminals 68 and 70 the current will flow from the ring 62 through the outer carbon body 48, the bearing and the inner carbon body to the rod 60 or vice versa.

By the use of the assembly shown in Fig. 3 pressure may be applied to one or both sides of a cylindrical bearing member and electrical energy may be conducted through the bearing member to produce a fusing temperature to securely weld the bearing material to the backing member of the bearing and this assembly may be inserted into a conventional welding machine for the fusing process in the same manner as the assembly illustrated in Fig. 1.

While a particular arrangement of apparatus for welding layers of bearing material to bearing backing members according to a particular method has been hereinabove described and illustrated in the accompanying drawing, it is to be understood that the invention is not limited to the particular arrangement of apparatus or the particular method so illustrated and described, but that such changes in the apparatus and in the various steps of the method may be resorted to as come within the scope of the subjoined claims.

Having now described the invention so that others skilled in the art may clearly understand the same, what it is desired to secure by Letters Patent is as follows:

1. Means for manufacturing a bearing element including a rigid backing member of at least partly cylindrical shape and a sheet metal liner of bearing material secured to at least one surface of said backing member, said means comprising, a member of a material of relatively high electrical resistance and at least partly cylindrical shape adapted to fit the exterior of said bearing element, a block of material of relatively low electrical resistance having one concave surface of at least partly cylindrical shape adapted to fit about said member of high resistance material and a flat surface adapted to rest upon a pressure and current transmitting support provided by an electric welding machine, a second member of material of relatively high electrical resistance having a convex surface of at least partly cylindrical shape adapted to fit the interior of said bearing and a concave surface adapted to receive a generally cylindrical member, and a generally cylindrical member of material of relatively low electrical resistance adapted to fit into the concave surface of said second member and having a flat surface adapted to receive an electrode of an electric welding machine.

2. Means for manufacturing a semi-cylindrical anti-friction bearing element having a layer of sheet bearing material applied to at least one surface of a rigid backing member including, an assembly for said bearing adapted to be inserted in a conventional welding machine for fusing bonding material between said layer of bearing material and said backing member, said assembly comprising, a metal base block having a semi-cylindrical depression in one side thereof and a plane surface on the opposite side thereof for contact with an electrode of said welding machine, a carbon lining for said base block having a semi-cylindrical surface shaped to fit one surface of said bearing and another semi-cylindrical surface shaped to fit the depression in said base block, a carbon block having a semi-cylindrical surface shaped to fit the opposite surface of said bearing and having a partly-cylindrical depression in one side thereof, and a partly cylindrical metal electrode fitting in said last mentioned depression and having a plane surface for contact with an electrode of said welding machine, said base block and said electrode extending the entire width of the respective high resistance blocks to assure an even distribution of heating current through said blocks.

3. Means for manufacturing an anti-friction bearing of a shape at least partly cylindrical having a layer of sheet bearing material applied to at least one surface of a rigid backing member including an assembly for said bearing adapted to be inserted in a conventional welding machine for fusing bonding material between said layer of bearing material and said backing member, said assembly comprising, members of a material having relatively high electric resistance contacting the opposite sides of said bearing and provided with surfaces of at least partly cylindrical shape, and metal members adapted to be disposed between said high resistance members and the electrodes of said welding machine having generally cylindrical surfaces contacting said high resistance members and plane surfaces contacting said electrodes.

4. Means for manufacturing an anti-friction bearing having a layer of sheet bearing material applied to at least one surface of a rigid backing member including an assembly for said bearing adapted to be inserted in a conventional welding machine for fusing bonding material between said layer of bearing material and said backing member, said assembly comprising, members of a material of relatively high electrical resistance together constituting a body within said bearing having a tapered central bore, members of a material having a relatively high electrical resistance constituting a body surrounding said bearing, a metal container for the outer high resistance body, and a tapered metal rod adapted to be inserted in said tapered bore.

5. Means for manufacturing an anti-friction bearing having a layer of sheet bearing material applied to at least one surface of a rigid backing member including an assembly for said bearing adapted to be inserted in a conventional welding machine for fusing bonding material between said layer of bearing material and said backing member, said assembly comprising, carbon members together constituting a body within said bearing having a tapered central bore, carbon members constituting a body surrounding said bearing, a split metal cylinder adapted to surround the outer carbon body, a separable clamp for compressing said cylinder about said carbon body, and a tapered metal rod adapted to be forced into said tapered bore to force the inner carbon body against said bearing.

6. Means for manufacturing an anti-friction bearing having a layer of sheet bearing material applied to at least one surface of a rigid backing member including an assembly for said bearing adapted to be inserted in a conventional welding machine for fusing bonding material between said layer of bearing material and said backing member, said assembly comprising, carbon members together constituting a body within said bearing having a tapered central bore, carbon members constituting a body surrounding said bearing, a split metal cylinder adapted to surround the outer carbon body, a separable clamp for compressing said cylinder about said carbon body, and a tapered metal rod adapted to be forced into said tapered bore to force the inner carbon body against said bearing, and a base plate comprising a metal ring adapted to underlie said split metal cylinder, and a body of insulating material adapted to underlie said carbon bodies and said bearing.

GILBERT C. BARNES.